United States Patent [19]

Burckhardt et al.

[11] Patent Number: 4,503,944
[45] Date of Patent: Mar. 12, 1985

[54] DEVICE FOR COOLING MOTOR VEHICLE WHEELS

[75] Inventors: Manfred Burckhardt, Waiblingen; Herbert Schulte, Leutenbach-Nellmersbach, both of Fed. Rep. of Germany

[73] Assignee: Daimler-Benz Aktiengesellschaft, Fed. Rep. of Germany

[21] Appl. No.: 380,405

[22] Filed: May 20, 1982

[30] Foreign Application Priority Data

May 20, 1981 [DE] Fed. Rep. of Germany ....... 3120021

[51] Int. Cl.³ .................... F16D 65/847; B60B 9/10
[52] U.S. Cl. .................... 188/71.6; 188/218 XL; 188/218 A; 188/264 AA; 188/264 W; 301/6 CS; 301/108 A
[58] Field of Search .......... 188/71.6, 218 R, 218 XL, 188/218 A, 264 R, 264 A, 264 AA, 264 W; 192/113 A; 308/DIG. 14; 301/6 CS, 6 CF, 6 WB, 108 R, 108 A

[56] References Cited

U.S. PATENT DOCUMENTS

| 1,979,181 | 10/1934 | Wenner | 188/264 A |
| 2,981,376 | 4/1961 | Zeidler | 188/264 AA |
| 3,059,730 | 10/1962 | Nickell et al. | 188/264 A |

FOREIGN PATENT DOCUMENTS

| 2110482 | 9/1972 | Fed. Rep. of Germany | 188/264 AA |
| 2432728 | 5/1976 | Fed. Rep. of Germany | |
| 1961139 | 12/1977 | Fed. Rep. of Germany | 188/71.6 |
| 2806014 | 8/1979 | Fed. Rep. of Germany | 188/218 A |
| 1031814 | 6/1953 | France | 188/264 R |
| 1075709 | 7/1967 | United Kingdom | 301/108 A |

Primary Examiner—Douglas C. Butler
Assistant Examiner—R. R. Diefendorf
Attorney, Agent, or Firm—Craig & Burns

[57] ABSTRACT

A device for cooling the wheels of motor vehicles which are equipped with disc brakes mounted on the wheels between the wheel centers and a cover plate. The rotors of the disc brakes are fastened to the wheel flange of the wheel hub by a pot-shaped part which delimits radially an annular space opening in the direction of the cover plate. The cover plate is provided with openings through which a cooling air stream can enter the wheel space containing the brake. The wheel center is provided with openings near a rim portion thereof through which air can escape from the outer annular space left between the brake and wheel center. The annular space communicates through a space between the rim and the brake with an annular space delimited by the remaining space and the cover plate in the axial direction. A jacket of the pot-shaped mounting part, by which an inner hub side annular space is delimited in the radial direction from the outer annular space, is provided with overflow openings disposed around a circumference of the jacket.

12 Claims, 2 Drawing Figures

DEVICE FOR COOLING MOTOR VEHICLE WHEELS

BACKGROUND OF THE INVENTION

The present invention relates to a cooling device and, more particularly, to a device for cooling motor vehicle wheels equipped with disc brakes located on the wheels between wheel centers and a cover plate, with rotors of the disc brakes being mounted to a wheel flange of a wheel hub by a pot-shaped mounting portion which delimits a radially annular space open toward the cover plate, and with the cover plate being provided with openings through which a cooling air stream may enter the wheel space accommodating the brake, and openings provided in the wheel center near the rim through which air may escape from an external annular space defined between the brake and the center, which annular space communicates, by way of a space between the rim and the brake, with an annular space delimited, in an axial direction, by the space between the rim and the brake and the cover plate.

A cooling arrangement of the aforementioned type has been proposed in, for example, Offenlegungsschrift 24 32 728, wherein a disc brake, constructed as a so called full disc brake, includes a pot-shaped mounting member or part integrally formed with a brake housing, with the mounting part being arranged so as to rotate with a hub of the vehicle wheel.

In the above-noted proposed arrangement, a cooling air stream entering through openings in a cover plate in approximately an axial direction, encounters an inner area of a ribbed section of the brake housing, as viewed in a radial direction with a rotation of the cooling air stream being immediately forced away in the radial direction from the point of entry. The cover plate, also of a pot-shaped construction, delects the cooling air stream over a peripheral area of the brake housing and the brake disc and into an outer annular space which is essentially delimited by the wheel center and an outer portion of the brake housing from where the air, possibly considerably heated in the brake chamber, flows out through an outlet opening in the wheel center. Thus, a direct heat transmission from parts of the brakes or wheels, considerably heated during a brake application, takes place only through the surfaces of those parts or components of the brakes which, as viewed in a radial direction, are disposed outside of the pot-shaped mounting part or member; whereas, the parts or components of the wheels which are disposed inside the pot-shaped mounting part or member, i.e., essentially the hub and wheel bearing, experience practically no cooling effects. Consequently, the inner wheels parts in particular are heated to a disporportionate degree especially, for example, during a prolonged braking application when descending a long hill thereby causing a drastic increase in the wear on the wheel bearings and sliding seals. Furthermore, the cooling air stream, already considerably heated in the space between the cover plate and the brake, after the deflection, is guided over the peripheral portions of the brake directly to the outlet openings of the outer annular space and, consequently, cannot produce any significant cooling in the annular space.

In an attempt to nevertheless achieve a more uniform bilateral cooling of the brake, it has been proposed to provide additional inlet openings for cooling air flowing inwardly from the outside of the wheel at a slight radial distance from the wheel axis; however, in order to compensate for the weakening of the wheel occasioned by the provision of such additional openings, the wheel center must have an especially solid construction in an area of the wheel center which is near the heavily stressed hub of the wheel.

SUMMARY AND OBJECTS OF THE INVENTION

The aim underlying the present invention essentially resides in providing a device for cooling motor vehicle wheels which ensures a more effective cooling of, for example, a disc brake arrangement, in a conventional wheel construction, in addition to ensuring a more effective cooling of wheel components which are in thermal contact with the disc brake.

In accordance with advantageous features of the present invention, a pot-shaped mounting portion is provided with a jacket by which an inner hub-side annular space is delimited in a radial direction from an outer annular space, with the jacket being provided with overflow openings disposed or distributed around a circumference of the jacket.

By virtue of the provision of these openings, in addition to a first cooling air flow channel that extends between a cover plate and the brake, the second channel is provided which leads from an interior of the wheel through an inner annular space of the pot-shaped mounting part or component into an area of an outer annular space near an axle of the wheel and through the latter to the outlet openings. This constructional arrangement results in a division of the cooling air stream, entering into an interior of the wheel through the opening in the cover plate, into two "parallel" partial streams, with one cooling air partial stream, guided through a conventional flow path, carrying away the heat primarily from an interior of the brake and the other cooling air partial stream, guided through the additional flow path provided by virtue of the features of the present invention, carrying away heat both from the hub, which is in good thermal contact with the brake through the pot-shaped mounting component or part, and the associated wheel flange, and from the mounting component or part and the outside of the brake, thereby cooling these additional components or parts.

Additionally, by virtue of the features of the present invention, a sufficient cooling of the brake under extreme conditions such as, for example, when descending a long hill, is ensured, when the brake is, for all practical purposes, operating continuously. Additionally, it is also assured that the components or parts which are in good thermal contact with the brake such as, for example, in the case of a front axle, the hub and wheel bearing as well as sliding seal which encloses the lubricant chamber on one side, and which are endangered by wear under such braking conditions, are better protected.

By virtue of the features of the present invention, it is possible, without any special adaptation, to utilize generally conventional wheels which are provided with suitable openings in an area near the rim.

In order to achieve a satisfactory cooling effect in the manner described hereinabove, advantageously, in accordance with the present invention, a volume of the cooling air, guided over the additional flow path, roughly corresponds to that volume which flows through the flow path leading through the space between the cover plate and the brake, to the outlet openings of the wheel where it is somewhat slightly larger.

In order to provide a favorable arrangement of cooling air inlet openings, advantageously, in accordance with further features of the present invention, at least some of the openings of the brake cover plate are disposed within a cross section of an inner annular space of the pot-shaped mounting or fastening part or member.

The guide surface of a brake cover plate employed, in a conventional manner for conducting cooling air into a brake space may, in accordance with the present invention, be constructed as a bulge which expands in a funnel-like manner in a forward direction, with the bulge, as viewed in a normal direction of travel of the motor vehicle, occupying a sector of approximately 60° to 90° in a vicinity of a lower wheel quadrant. By virtue of this arrangement, an increase of the cooling air volume distributed over the two flow paths may be achieved in a simple fashion by utilization of the dynamic effect.

A considerable intensification of the cooling air partial streams utilized to cool the brake and the wheel may be achieved by a ventilating effect obtainable with a specifically constructed wheel cover which, according to the present invention, is adapted to be mounted externally on the vehicle wheel, with the wheel cover being provided on an inner side thereof, facing the wheel center, with ribs or blades extending radially and, in an area near the axle, with inlet openings for cooling air flowing inward from the exterior. Additionally, outlet openings may be provided in a circumferential area of the wheel cover in an area of the rim of the wheel.

In order to provide a wheel cover construction which is not only esthetic but functionally efficient for the purposes of cooling, advantageously, in accordance with the present invention, the wheel cover includes a concave centrally disposed insert portion and an outer annular disc shaped portion with the outer portion being connected by radial ribs with the central portion in such a manner that the central portion is disposed at a smaller distance from a hub of the wheel than an inner edge of the outer portion of the wheel cover.

In order to provide a wheel cover which is economically manufacturable and which is capable of exhibiting a sufficient heat resistance, advantageously, the wheel cover is made of a fiberglass-reinforced injection-molded plastic part.

To enhance the cooling effects of the cooling device of the present invention, a fan is provided interiorly of the pot-shaped mounting member, with the fan being adapted to accelerate at least a portion of the cooling air stream, entering through the inlet openings in the cover plate and into the wheel space, in an axial direction, and forcing the air through the openings in the mounting part into the outer annular space of the wheel thereby increasing the cooling air throughflow through the additional flow path. The fan may also advantageously be constructed so that it distributes the incoming cooling air stream in a desired ratio between the two parallel flow paths.

The cooling device of the present invention is essentially suitable both for full disc brakes with non-rotatably mounted brake discs and rotating brake housings as well as for partial disc brakes with rotating brake discs and fixed brake calipers and may be manufactured in an especially simple manner by providing radial bores disposed axially symmetrically along a central jacket line of the disc-shaped member, with the radial bores forming overflow openings.

To provide an especially advantageous construction as a result of systematic testing, with a brake disc of a partial disc brake arrangement, an inside diameter of the disc-shaped member should be about 150 mm, with a wall thickness of the disc-shaped member being approximately 4 mm, and a depth, measured in an axial direction between an inside of a bottom portion of the pot-shaped member and the brake surface being approximately 30 mm, and with at least 10–15 radial bores or through holes being provided, each of which has a diameter of about 18 mm.

While in a full disc brake the brake housing that forms the rotor may be provided with ribs which promote or support a radial movement of the cooling air streams, in partial disc brakes, wherein surfaces of the disc brake that delimit the outer annular space and space between the cover plate and brake, on one side of each, are smooth, advantageously, as viewed in a normal direction of rotation of the wheel, a guide plate is provided forwardly of the brake caliper of the partial disc brake, with the guide plate being adapted to deflect the cooling air partial streams flowing in the space between the brake disc and brake cover plate as well as in the outer annular space in a radially outward direction.

Accordingly, it is an object of the present invention to provide a cooling device for motor vehicle wheels which avoids, by simple means, shortcomings and disadvantages encountered in the prior art.

Another object of the present invention resides in providing a cooling device for motor vehicle wheels which reduces wear on wheel bearings and seals.

Yet another object of the present invention resides in providing a cooling device for motor vehicle wheels which not only cools the brake arrangement of the vehicle wheels but also cools associated component parts which are in good thermal contact with the brake arrangement.

A further object of the present invention resides in providing a cooling device for motor vehicle wheels which optimizes the circulation of cooling air steams through the wheels.

A still further object of the present invention resides in providing a cooling device for motor vehicle wheels which minimizes the failure of a brake arrangement associated with the wheels even under extreme operating conditions.

These and other objects, features, and advantages of the present invention will become more apparent from the following description when taken in connection with the accompanying drawing which shows, for the purposes of illustration only, one embodiment in accordance with the present invention.

DETAILED DESCRIPTION OF THE PREFERRED EMBODIMENT

Figure 1:
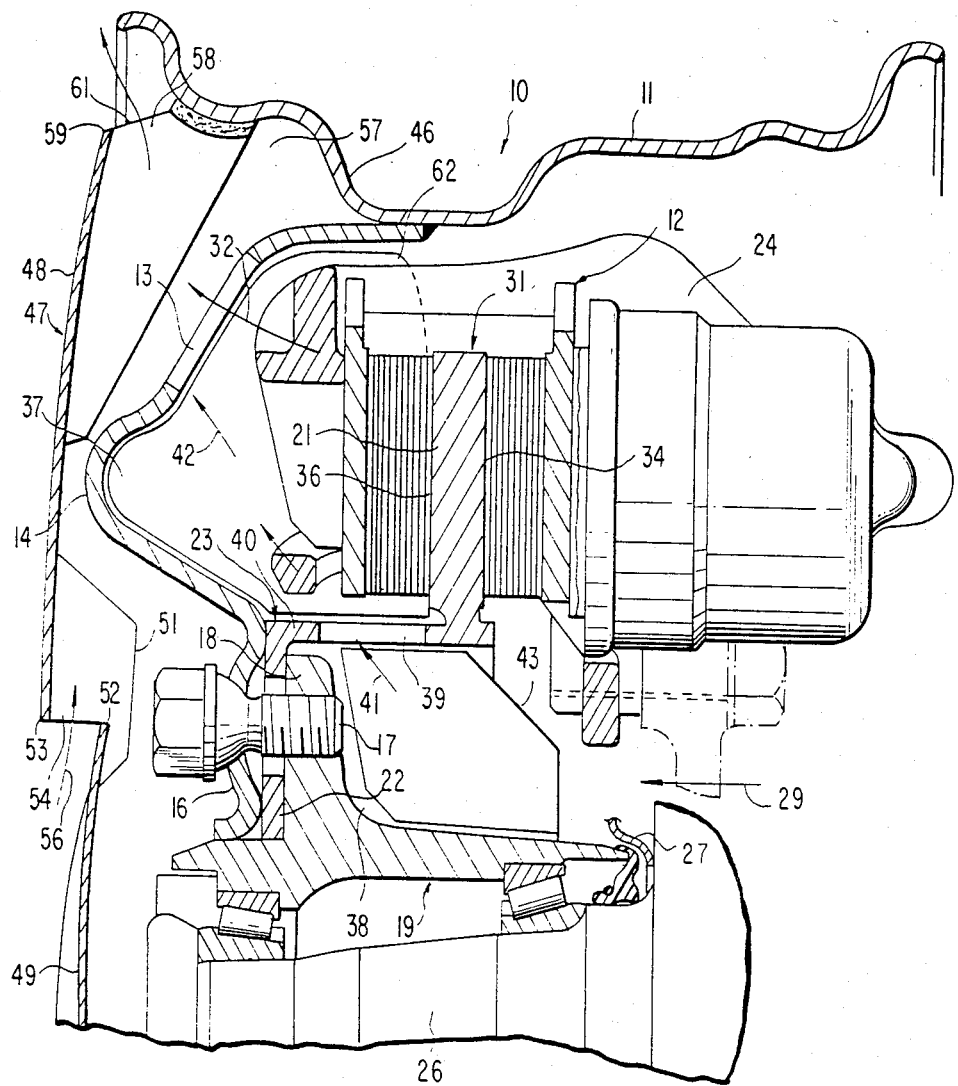
FIG. 1 is a partial longitudinal cross sectional view of a cooling device for a non-powered front wheel of a motor vehicle.

Referring now to the drawings wherein like reference numerals are used in both views to designate like parts and, more particularly, to FIG. 1, according to this Figure, a cooling device generally designated by the reference numeral 10 for a motor vehicle wheel generally designated by the reference numeral 11 is provided for achieving an effective and uniform a cooling as possible of both a disc brake generally designated by the reference numeral 12 located interiorly of the wheel 11 and the wheel 11 itself, especially in a center area thereof, so as to avoid, to the maximum possible degree, even under extreme operating conditions such as, for example, when applying the disc brake 12 for a long period of time when descending a hill, both a failure of the disc brake and damage to those components that are in direct thermal contact with the disc brake 12.

Without limiting the general nature of the present invention, it is assumed that the cooling device 10 is provided on a non-powered front wheel of an automobile, with the wheel 10 being assumed to be a conventionally constructed steel wheel having a convex wheel center 14 for reducing the load, air outlet openings 13 in areas near a rim of the wheel 11, and a flat hub 16, by means of which the wheel 11 is bolted to a wheel flange 18 of a wheel hub generally designated by the reference numeral 19 through lead bolts 17. The disc brake 12 is assumed to be a partial disc brake having a brake disc 21 non-rotatably fastened to the wheel hub 19 by an annular flange-shaped bottom portion 22 of a pot-shaped fastening or mounting member generally designated by the reference numeral 23 between the wheel center 16 and a wheel flange 18. Axially extending pins or projections provided on the wheel flange 18, usually provided to transmit torque, positively engage in the holes in the bottom portion 22 of the member 23. A brake caliper generally designated by the reference numeral 24 is arranged at each side of a front axle having an axle element 26 schematically illustrated in the drawing for the purposes of simplification.

Figure 2:
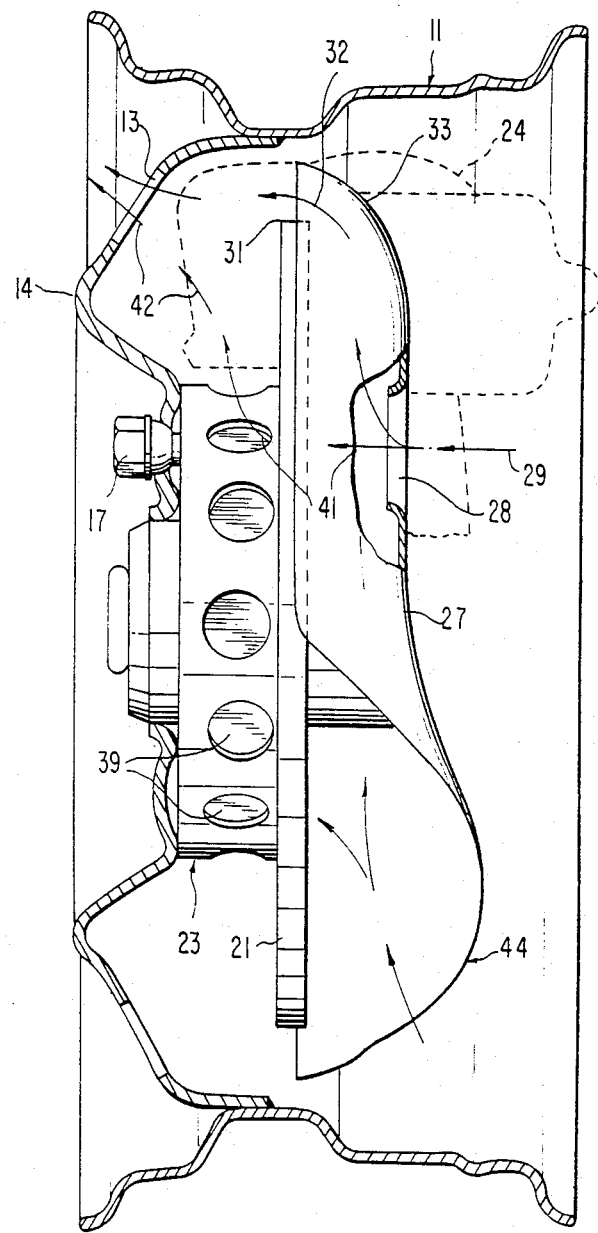
FIG. 2 is a partial cross sectional view of a constructional arrangement of a cover plate of the cooling device of the present invention.

As shown in FIG. 2, a brake cover plate 27 is fastened to the brake caliper or stator 24 on the axle end 26, with the cover plate 27 being provided on an inside of the disc brake 12 opposite the wheel center 14. The brake cover plate 27 is provided with air inlet openings 28, through which cooling air, passing from an interior of the wheel 11 in a direction of the arrow 29, enters in an axial direction through the brake cover plate 27 and brake disc 21.

By virtue of the fact that air participating in the rotational movement of the wheel 11 rotates, inside the wheel in an air layer adjoining the wheel center 14, externally at a greater circumferential velocity in an area near the rim that in an area of the wheel 11 near the axle or hub, a radial pressure drop occurs as the wheel 11 rotates and, as shown in FIG. 2, an air stream radially enters through openings 28 of the brake cover plate 27, essentially in an axial direction, is deflected radially outwardly and over the peripheral edge 31 of the brake disc 21, in a direction of the arrow 32, toward the air outlet openings 13 in the wheel center 14, whereby an outwardly directed edge bead 33 of the brake cover plate 27 acts as a guide surface to reinforce the air stream deflection.

In previously proposed wheel cooling arrangements, only a cooling air flow path which extends radially outwardly between the brake cover plate 27 and brake disc 21 has been provided for cooling air which flows from the interior of the wheel 11 toward the brake 12. Thus, in the previously proposed cooling arrangements, the cooling air stream 29 formed from the interior only, for practical purposes, achieves effective heat removal over an inside brake surface 34 of the brake disc 21.

In order to also have an effective heat removal from an outer annular space 37, delimited in an axial direction by the wheel center 14 and the outer brake surface 36 of the brake disc 21, as well as an effective heat removal from an inner annular space 38 delimited by the pot-shaped mounting member 23 and wheel hub 19, as shown in FIG. 2, the cylindrical jacket 40 of the pot-shaped mounting member 23 is provided with additional opeings 39 through which a second cooling air stream path, designated by the arrows 41, 42 is produced, and through which a portion of the cooling air stream 29, entering from the air inlet openings 28 in the brake cover plates 27, may flow past the outer brake surface 36 of the brake disc 21 to the outlet openings 13 in the brake center 14.

These additional cooling air partial streams 41, 42 produce an effective heat loss or removal from the parts of the wheel 11 which are in direct thermal contact with the brake disc 21, namely, the hub 19, flange 18, and hub 16, and therefore produce effective cooling of the wheel 11 as a whole. In order to maintain the flow resistance of this additional flow path or cooling air partial streams 41, 42, as low as possible, the number of openings 39 and dimensioning thereof is such that the openings 39 are compatible with a sufficient disc strength. For example, when an inside diameter of the pot-shaped mounting member 23 is about 15 cm, the jacket is about 4 mm, and a depth of the pot-shaped mounting member 23, as measured between the outer brake surface 36 of the brake disc 21 and the inner surface of the annular flange shaped bottom portion 22 is about 30 mm, with between 10 and a maximum of 15 openings 39 having a diameter of 18 mm being provided and being axially symmetrically distributed.

In order to ensure that a sufficient portion of the cooling air stream 29 entering from inside of the wheel 11 reaches the inner annular space 38 and flows out through the openings 39, at least some of the inlet openings 28 in the brake cover plates 27 are disposed interiorly of the inside cross section of the pot-shaped mounting member 23.

Additionally, as shown in FIG. 1, a fan wheel 43, is provided, mounted on the hub 19, with the fan wheel 43 favoring or causing an intensification of the air flow to the through openings 39 and also producing, by virtue of an axial and radial ventilating action thereof, a favorable distribution of the cooling air stream 29 to the partial air streams 41, 42 and 32, thereby resulting in a cooling of the brake disc 21 on an interior and exterior thereof.

In order to conduct the largest possible volume of cooling air into the inner annular space 38 of the pot-shaped mounting member 33 and into the space which is limited by the inside brake surface 34 and brake cover plate 27, the brake cover plate 27 is provided on its lower forward quadrant, at a position opposite the brake caliper or stator 24 with a funnel-shaped bulge generally designated by the reference numeral 44 which, as viewed in a normal direction of travel of the wheel 11, opens toward a front of the wheel 11, and which enables the cooling air to be conducted, through dynamic action, into the inner annular space 38 and the space between the brake disc 21 and brake cover plate 27.

In order to facilitate an escape of cooling air partial streams 32, 41, 42, in an intensified manner through the outlet openings 13 in the wheel center 14, and also to achieve external cooling of the wheel center 14, in accordance with the present invention, the cooling device 10 of the present invention includes a specifically constructed wheel cover generally designated by the reference numeral 47, with the wheel cover 47 adapted to be mounted on a rim 46 of the wheel 11. The wheel cover 47 includes an external flatly convexly curved annular disc-shaped outer element 48 and an inner circular disc-shaped or flatly concave element or member 49. The element or member 49 is displaced slightly offset in an axial direction with respect to the wheel hub with regard to the outer element or member 48 and is connected thereto by radial ribs 51.

Cooling air for cooling the brake 12 and associated components may additionally be drawn in from the outside of the wheel through the annular space 54 defined between an outer edge 52 of the inner member 49 and an inner edge 53 of the outer member 48, with the annular space 54 being subdivided into sectors by the radial ribs 51. The cooling air may also be drawn into an additional outer annular space 57 defined between the outer member 48 and wheel center 14 in an axial direction, in the radial direction, the cooling air passes over the wheel center 14 on the outside and promotes additional cooling of the wheel center 14. The outer member 48 in the additional outer annular space 57 is provided with radial blades 58, the rotation of which causes a powerful radial momentum to be given to the cooling air stream 56 which enters in through the inner annular space 54 as well as deflecting the air stream toward the outer annular space 61, delimited or defined by the outer edge 59 of the outer member 48 and rim 46, together with the cooling air pressure streams 32, 41, 42, which exit or emerge through the openings 13 of the wheel center 14. The cooling air streams flow through the outer annular spce 61 at a satisfactorily high air throughflow rate.

The wheel cover 47 is constructed as an injection-molded plastic part and, preferably, is made of a fiber-glass-reinforced polyamide (PA) polypropylen (PP), or acrylonitrile-butadiene-styrene copolymer ("ABS") material.

In order to produce an intensified radial flow in the outer annular space 47, defined between the wheel center 14 and brake disc 21, as well as in the space between the brake disc 21 and brake cover plate 27, advantageously, as shown in FIG. 1, a radially extending guide plate 62 may be mounted on the stator or caliper 24 of the brake 12. The guide plate 62, as viewed in a normal direction of rotation of the wheel 11, is disposed forwardly of the stator or caliper 24 of the brake 12 and, by virtue of the dynamic action of the plate 62, favors both a flowing away of the cooling air partial streams 32, 41, 42 through the outlet openings 13 in the wheel center 14 as well as an influx of cooling air through the inlet openings 28 of the brake cover plate 27 or the bulge 44 provided in the brake cover plate 27.

By virtue of the provision of a cooling device 10 constructed in accordance with the present invention, a simple rotation of the wheel 11 produces an effective forced ventilation of the wheel 11 so that even in the case of an overall especially flow favorable construction of the vehicle, which results in a situation in which there is no significant pressure differential between the space inside the vehicle and the wheel hub area, even with the vehicle travelling rapidly, effective cooling of the brake 12 and wheel 11 is nevertheless ensured. This especially true in critical areas of the sealing ring generally provided on the hub of a motor vehicle wheel.

While we have shown and described several embodiments in accordance with the present invention, it is understood that the same is not limited thereto but is susceiptible of numerous changes and modifications as known to one having ordinary skill in the art and we therefore do not wish to be limited to the details shown and described herein, but intend to cover all such modifications as are encompassed by the scope of the appended claims.

We claim:

1. A cooling device for a motor vehicle wheel equipped with a disc brake means mounted between a wheel center and a brake cover plate means, the cooling device including a pot-shaped mounting means for securing a rotor means of the disc brake means to a wheel flange of a hub of the wheel, the pot-shaped mounting means defining an inner annular space opening in the direction of the cover plate means, opening means provided in the cover plate means arranged within a cross section of the inner annular space of the pot-shaped mounting means for enabling a cooling air stream to enter the inner annular space, further opening means provided in the wheel center in an area near a rim of the wheel for enabling the cooling air stream to escape from an outer annular space between the disc brake means and the wheel center, said pot-shaped mounting means including a jacket portion for delimiting an inner hub side of the outer annular space, a plurality of additional opening means being arranged about a circumference of the jacket portion for communicating the inner and outer annular spaces, axially/radially effective fan means provided on the hub of the wheel in the inner annular space defined by the pot-shaped mounting means, the fan means being adapted to force a component of the cooling air stream entering a space between the brake and cover plate means into the outer annular space between the disc brake means and the wheel center, thereby providing, in a defined ratio, distribution of the cooling air stream into partial air streams, one of which flows along an inner surface of the rotor means and another of which flows along an outer surface of the rotor means to the opening means in the wheel center arranged in the area near the rim of the wheel.

2. A cooling device according to claim 1, wherein a sector of the brake cover plate means disposed in an area of a forward lower wheel quadrant, as viewed in a normal direction of travel of the motor vehicle, is provided with a funnel-type bulge expanding in a forward direction.

3. A cooling device according to claim 2, wherein the cooling device further includes a wheel cover means adapted to be externally mounted on the wheel, the wheel cover means including a plurality of radially extending rib means provided on an inner side of the wheel cover means, inlet air opening means provided in an area near an axle of the wheel for enabling an inward flow of cooling air from an exterior of the wheel, and outlet opening means provided in an outer circumferential area near a rim of the wheel for enabling a discharge of the cooling air.

4. A cooling device according to claim 3 wherein the wheel cover means further includes a concave centrally disposed inner part and an annular disc-shaped outer part, radially extending rib means are provided for connecting the inner and outer parts in such a manner that the inner part is disposed at a smaller distance from the hub of the wheel than an inner edge of the outer part of the wheel cover means.

5. A cooling device according to claim 4 wherein the wheel cover means is fashioned as a fiberglass reinforced injection-molded plastic part.

6. A cooling device according to claim 1, wherein the disc brake means are partial disc brakes, and the additional opening means include radially extending bores disposed axially symmetrically of a center line of the jacket portion, with the bores functioning as overflow openings.

7. A cooling device according to claim 6 wherein the pot-shaped mounting means has an inner diameter of about 150 mm, a wall thickness of approximately 4 mm, and an axial depth between a bottom portion thereof and an outer brake surface of approximately 30 mm, and the plurality of additional opening means are in the range of at least 10 to a maximum of 15, with each of the additional opening means having a diameter of 18 mm.

8. A cooling device according to claim 7, wherein guide plate means are provided forwardly of the rotor means, as viewed in a normal direction of rotation of the wheel, the guide plate means being adapted to radially outwardly deflect cooling air partial streams flowing in a space between the brake disc means and the brake cover plate means and in the outer annular space.

9. A cooling device according to claim 6, wherein the cooling device further includes a wheel cover means adapted to be externally mounted on the wheel, the wheel cover means including a plurality of radially extending rib means provided on an inner side of the wheel cover means, inlet air opening means provided in an area near an axle of the wheel for enabling an inward flow of cooling air from an exterior of the wheel, and outlet opening means provided in an outer circumferential area near a rim of the wheel for enabling a discharge of the cooling air.

10. A cooling device according to claim 9, wherein the wheel cover means further includes a concave centrally disposed inner part and an annular disc-shaped outer part, radially extending rib means are provided for connecting the inner and outer parts in such a manner that the inner part is disposed at a smaller distance from the hub of the wheel than an inner edge of the outer part of the wheel cover means.

11. A cooling device according to claim 1, wherein the cooling device further includes a wheel cover means adapted to be externally mounted on the wheel, the wheel cover means including a plurality of radially extending rib means provided on an inner side of the wheel cover means, inlet air opening means provided in an area near an axle of the wheel for enabling an inward flow of cooling air from an exterior of the wheel, and outlet opening means provided in an outer circumferential area near a rim of the wheel for enabling a discharge of the cooling air.

12. A cooling device according to claim 11, wherein the wheel cover means further includes a concave centrally disposed inner part and an annular disc-shaped outer part, radially extending rib means are provided for connecting the inner and outer parts in such a manner that the inner part is disposed at a smaller distance from the hub of the wheel than an inner edge of the outer part of the wheel cover means.

* * * * *